(12) United States Patent
Mathur et al.

(10) Patent No.: US 9,029,784 B1
(45) Date of Patent: May 12, 2015

(54) SPECTRALLY RESOLVED PULSE HEIGHT ANALYSIS FOR NEUTRON-GAMMA DISCRIMINATION

(75) Inventors: Veerendra K. Mathur, Beltsville, MD (US); John H. Barkyoumb, Kensington, MD (US); Noel A. Guardala, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 863 days.

(21) Appl. No.: 13/247,010

(22) Filed: Sep. 28, 2011

(51) Int. Cl.
*G01T 1/20* (2006.01)
*G01T 3/06* (2006.01)
*G01T 1/202* (2006.01)

(52) U.S. Cl.
CPC ............... *G01T 3/06* (2013.01); *G01T 1/2023* (2013.01)

(58) Field of Classification Search
CPC .......... G01T 1/202; G01T 1/2023; G01T 3/06
USPC .............................................. 250/362, 361 R
See application file for complete search history.

(56) References Cited

U.S. PATENT DOCUMENTS

| | | | |
|---|---|---|---|
| 4,947,465 A | 8/1990 | Mathur et al. | |
| 5,045,707 A | 9/1991 | Chakrabarti et al. | |
| 5,880,469 A * | 3/1999 | Miller | 250/367 |
| 6,445,861 B1 * | 9/2002 | Shaw et al. | 385/123 |
| 7,795,120 B1 * | 9/2010 | Price et al. | 438/512 |
| 7,857,993 B2 | 12/2010 | Dai et al. | |
| 7,902,525 B2 | 3/2011 | Akselrod et al. | |
| 7,943,911 B2 | 5/2011 | Akselrod et al. | |
| 7,964,854 B2 | 6/2011 | Akselrod et al. | |
| 7,965,816 B2 | 6/2011 | Kravis et al. | |
| 2002/0175291 A1 * | 11/2002 | Reeder et al. | 250/369 |
| 2006/0054863 A1 | 3/2006 | Dai et al. | |
| 2006/0219928 A1 * | 10/2006 | Derenzo et al. | 250/370.11 |
| 2007/0295915 A1 | 12/2007 | Kramer et al. | |
| 2008/0315108 A1 | 12/2008 | Stephan et al. | |
| 2009/0078881 A1 | 3/2009 | Dangendorf et al. | |
| 2009/0242784 A1 | 10/2009 | Kraemer et al. | |

(Continued)

OTHER PUBLICATIONS

Edgar V. Van Loef, Cody M. Wilson, W. W. Moses, and Kanai S. Shah, "Novel Scintillators with Neutron/Gamma Discrimination, Cs(NH4)MYX6:Ce3+ (M = Li, Na; X = F, Cl)," 2000 IEEE Nuclear Science Symposium Conference Record, Oct. 19-25, 2008, Dresden, Germany, pp. 1202-1205 (date of current version: Feb. 6, 2009).

*Primary Examiner* — Mark R Gaworecki
(74) *Attorney, Agent, or Firm* — Howard Kaiser (57) ABSTRACT

Typical practice of the present invention performs measurement and processing of two forms of light emissions—viz., unfiltered and filtered—of a core-valence luminescent (CVL) scintillator impinged by ionizing radiation emanating from a radioactive source. When unfiltered, the CVL scintillator light emission is inclusive of gamma emissions and neutron emissions. When filtered by a filtering apparatus that transmits CVL light only, the CVL scintillator light emission is inclusive of gamma emissions but is exclusive of neutron emissions. Algorithmic comparison between the two sets of empirical data provides discriminative information regarding gamma emissions versus neutron emissions. Essentially, the difference is taken between the unfiltered pulse height spectra data and the filtered pulse height data. The set of pulse height spectral data thus computed via subtraction is indicative of the portion of the CVL scintillator light emissions that is inclusive of neutron emissions but is exclusive of gamma emissions.

20 Claims, 9 Drawing Sheets

(56) References Cited

U.S. PATENT DOCUMENTS

| | | |
|---|---|---|
| 2010/0155617 A1 | 6/2010 | Stephan et al. |
| 2010/0200758 A1* | 8/2010 | Fukuda et al. ............... 250/362 |
| 2011/0024634 A1* | 2/2011 | Shah et al. .................. 250/362 |
| 2011/0024635 A1* | 2/2011 | Shah et al. .................. 250/362 |
| 2011/0101230 A1 | 5/2011 | Inbar |
| 2013/0032722 A1* | 2/2013 | Szupryczynski et al. ..... 250/366 |
| 2013/0181137 A1* | 7/2013 | Watanabe et al. ............ 250/369 |
| 2013/0341511 A1* | 12/2013 | Shah et al. ................ 250/361 R |

* cited by examiner

SPECTRALLY RESOLVED PULSE HEIGHT ANALYSIS FOR NEUTRON-GAMMA DISCRIMINATION

BACKGROUND OF THE INVENTION

The present invention relates to scintillators, more particularly to methods and systems for discriminating between photon-related light emission and neutron-related light emission in contexts of detecting or observing scintillation.

Scintillators are materials that emit light when a gamma photon or a charged particle passes through its active volume and is absorbed. This light can be detected by an electronic light sensor such as a photomultiplier tube (PMT) or a photodiode. The light sensor generates light pulses when a photon or charged particle passes through the scintillator material that is optically coupled to it.

A scintillation detector (also known as a scintillation counter) is a type of radiation detector that includes a scintillator and an electronic light sensor to which the scintillator is optically coupled. The light sensor absorbs the light emitted by the scintillator, resulting in the generation of electrical (light) pulses that can provide information about the photons or charged particles that originally encountered the scintillator.

The height (magnitude) of a pulse is proportional to the total energy of the photon absorbed in the scintillator. These pulses can be sorted according to their heights through appropriate electronic processing, and stored in different channels of a device known as a multi-channel analyzer (MCA).

The plot of channel number versus the number of pulses in a channel is called a pulse height spectrum. The channels of the MCA are calibrated in terms of energy most commonly using the gamma photons with an energy of 662 keV emitted by the radionuclide $^{137}$Cs. This signal processing and storage enables the MCA to determine the gamma energy spectrum of a given radionuclide. The gamma energy spectrum is unique to a specific radionuclide and thus helps in its identification.

Neutrons are not capable of creating any light pulses by their direct interaction with the scintillator material, but are capable of producing charged particles when the neutrons are absorbed by specific nuclides such as $^6$Li, $^{10}$B, and a number of Gadolinium isotopes. Another process by which an incident fast neutron can produce a charged particle is by knocking out protons from hydrogenous materials.

Pulse shapes and pulse-height spectrums produced by charged particles differ in characteristics from pulse shapes and pulse-height spectrums produced via incident energetic photon interactions. However, the differences are not so extensive that the two categories of light emissions can be completely resolved from each other in the current state of the art. Therefore, there is a need to further improve the techniques to discriminate between the two distinct modes of energy release inside the active scintillator volume. The classical approach to differentiating between gamma and neutron signals is to study the pulse shape. The traditional assumption is that pulse-height spectrum is not sufficient to discriminate between gamma photons and neutrons.

Most gamma-sensitive scintillators lack the capability to detect neutrons. Conventional practice is to utilize two different types of scintillator materials to detect both gamma photons and neutrons. However, a new class of scintillators has been discovered that exhibit the phenomenon of core-valence luminescence (CVL). These scintillators emit core-valence luminescence (CVL), in addition to giving off self-trapped exciton (STE) and activator emissions.

SUMMARY OF THE INVENTION

In view of the foregoing, it is an object of the present invention to provide an improved methodology, in association with scintillation detection, for discriminating between (i) light emissions associated with photons, such as produced by gamma photon interaction with scintillator material, and (ii) light emissions associated with charged particles, such as produced by neutron absorption by scintillator material.

The present invention, as typically embodied, provides a novel methodology for performing scintillation detection, and analyzing data provided via scintillation detection, so as to discriminate between gamma-ray photons and neutrons emitted from radionuclides. Uniquely featured by the present invention is its implementation of "spectrally resolved pulse height analysis." The inventive method "spectrally resolves" one or more pulse height spectrums so as to efficaciously perform neutron-gamma discrimination.

In accordance with typical embodiments of the present invention, first and second pulse height spectral data sets are generated. The first pulse height spectral data set is based on electrical pulses, generated by a light sensor, that are indicative of unfiltered light that is emitted by a core-valence luminescence scintillator. The second pulse height spectral data set is based on electrical pulses, generated by a light sensor, that are indicative of filtered light that is emitted by the core-valence luminescence scintillator. The filtered light is light that is filtered as core-valence luminescent light, only. The first and second pulse height spectral data sets are compared so as to discriminate between gamma emissions and neutron emissions.

It has come to be understood in the art that core-valence luminescence is produced by gamma photons, and not by neutrons. $Cs_2LiYCl_6$:Ce is a CVL scintillator for which the CVL emission occurs in the neighborhood of 300 nm, and the cerium emission occurs in the approximate range of 375-400 nm. Cerium emission will be excited both by photons and neutrons. The present invention uniquely avails itself of the established fact of CVL production being entirely by gamma photons. The present invention recognizes and takes advantage of the potential of scintillators that contain natural lithium as one of the constituents, and that exhibit the phenomenon of core valence luminescence, to detect both gamma photons and neutrons. The spectral emissions under gamma irradiation and neutron irradiation, respectively, are distinctly different. Gamma photons can excite core valence luminescence, and can also excite self-trapped exciton emission or impurity emission. In contrast, charged particles can excite self-trapped exciton emission or impurity emission, but cannot excite core valence luminescence. Neutrons that are captured in lithium (e.g., $^6$Li) to produce charged particles cannot excite core valence luminescence.

According to typical inventive practice, scintillator emission is passed through a special optical filter, viz., an optical filter that transmits only CVL emission. The filtered scintillator emission falls on the photocathode of a photomultiplier. In the pulse height spectrum of the filtered scintillator emission, only gamma peaks are observed. In addition, for comparative purposes, unfiltered scintillator emission is caused to fall on the photocathode of a photomultiplier. The unfiltered scintillator emission is characterized by a pulse height spectrum in which both gamma peaks and neutron peaks are observed. Vis-à-vis the unfiltered scintillator emission, the filtered scintillator emission is characterized by a pulse height spectrum in which gamma peaks are observed and neutron peaks disappear. In this manner, the present invention implements CVL scintillators for both detection of, and discrimination between, gamma photons and neutrons.

The term "optical filter," as used herein in the context of inventive practice, broadly refers to any optical filter that selectively transmits some light (e.g., a range of wavelengths) while blocking remaining light. Optical filters are conventionally categorized as either "absorptive" filters or "dichroic" filters (also known as "reflective" filters, "thin film" filters, or "interference" filters). Absorptive filters absorb the unwanted portion(s) of light while transmitting the wanted portion(s) of light. Dichroic filters reflect the unwanted portion(s) of light while transmitting the wanted portion(s) of light. In order to block non-CVL emission, inventive practice can implement one or more absorptive filters, or one or more dichroic filters, or a combination thereof. A "grating monochromator" is an example of a dichroic filter than may be propitiously implemented in some inventive embodiments.

Generally speaking, spectral discrimination analysis is inherently simpler than pulse-shape analysis or time-discrimination analysis. The inventive method is based on spectral discrimination, and hence tends to be less complicated than conventional neutron-gamma discrimination methods. Furthermore, typical embodiments of the inventive method require one detector and non-elaborate filtering capability such as provided by one filter or a series of filters, for instance consisting of or including a grating monochromator.

Moreover, the present invention's use of CVL-capable scintillators permits one scintillator to detect neutrons and gamma photons both, thereby reducing costs, sizes, and weights of detection systems. These benefits are especially significant in security applications such as involving boarding and search-and-seizure operations. The inventive method can also avail itself of the substantial infrastructure of processing or multiplexing visible light signals using commercial off-the-shelf optoelectronics.

Pulse-shape analysis, the principal conventional method for performing neutron-gamma discrimination, requires equipment and processing that are relatively bulky and expensive. Pulse-shape analysis also requires specialized knowledge to correctly set the time or to correctly shape discriminators. Besides pulse-shape analysis, proton-recoil methods have been known for detecting fast neutrons and have been considered for performing neutron-gamma discrimination; however, proton-recoil methods are inefficient and do not necessarily detect gamma photons at the same time that they detect fast neutrons.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 3 is a graph illustrating a pulse height spectrum of neutrons produced by Be(p,n) reaction in a $Cs_2LiYCl_6$:Ce scintillator.

FIG. 6 is a graph, similar to FIG. 3, illustrating a pulse height spectrum of neutrons produced by Be(p,n) reaction in the same $Cs_2LiYCl_6$:Ce scintillator material used for FIG. 3. FIG. 6 is representative of a scintillation pulse height spectrum based on measured data in the filtered emission phase of the present invention's method for performing neutron-gamma discrimination. The filtered light emissions are produced solely by gamma photons.

FIG. 8 is a graph, similar to FIGS. 3 and 6, illustrating a pulse height spectrum of neutrons produced by Be(p,n) reaction in the same $Cs_2LiYCl_6$:Ce scintillator used for FIGS. 3 and 6. FIG. 8 is representative of a scintillation pulse height spectrum computationally generated in the filtered-versus-unfiltered emission-comparison phase of the present invention's method for performing neutron-gamma discrimination.

DESCRIPTION OF EXEMPLARY
EMBODIMENTS OF THE INVENTION

Figure 1:
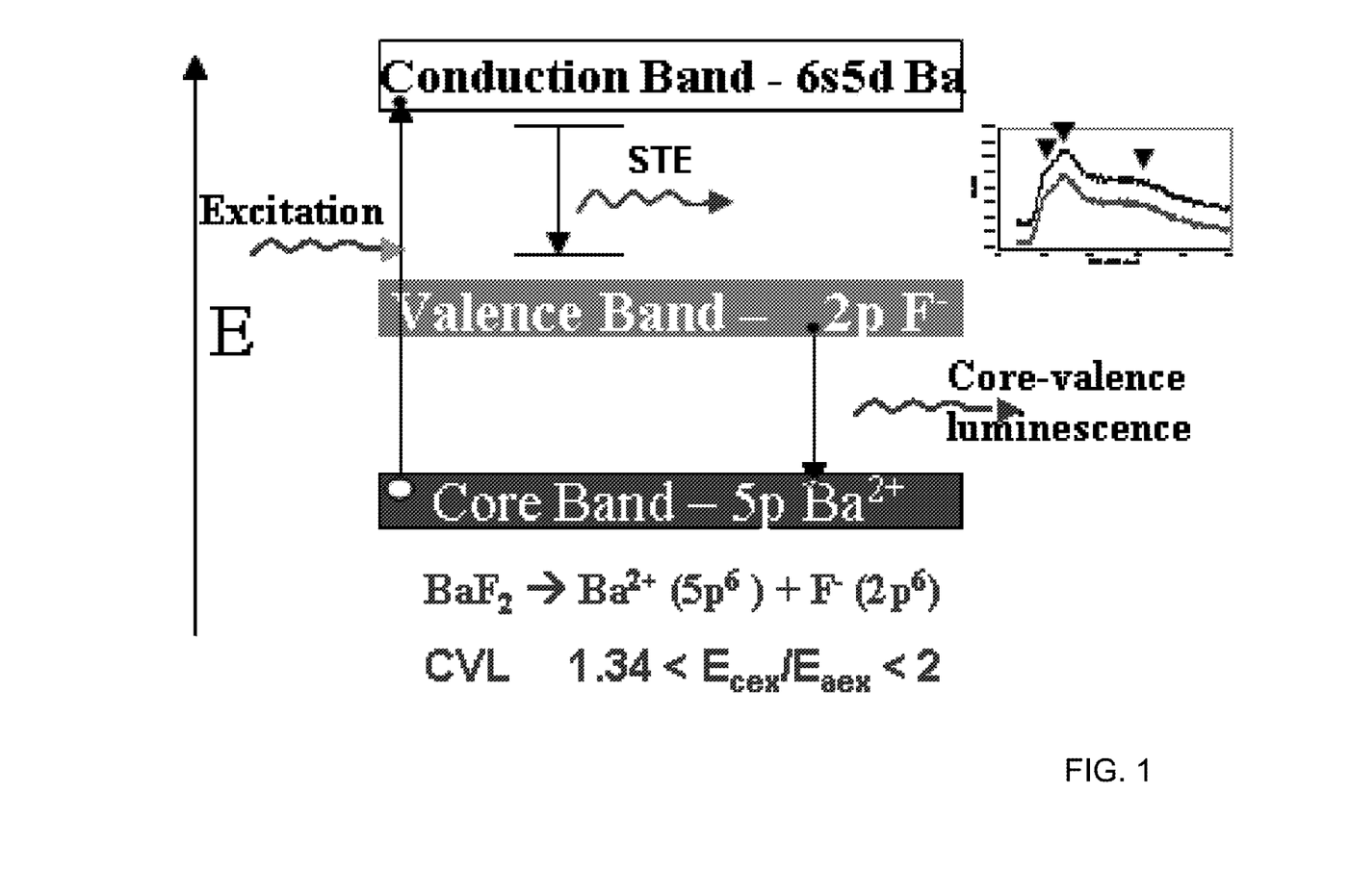
FIG. 1 is an energy band diagram depicting the respective origins of core-valence luminescence and self-trapped exciton emission in $BaF_2$, a CVL scintillator.

Referring now to FIG. 1, core-valence luminescence (CVL) arises when an electron from the valence band recombines with a hole in the first core band. Thus, the minimum energy required for the generation of CVL is the energy required to excite an electron from first core band to conduction band. On the other hand, the minimum energy required for forming the exciton is the energy required to excite an electron from valence band to conduction band.

High-energy photons are capable of exciting CVL, self-trapped exciton (STE), and impurity emissions. However, charged particles do not produce electron-hole pairs that are energetic enough to produce CVL. Thus, the charged particles produced by a neutron's interaction with the solid will not excite CVL, but there is sufficient energy in the electron-hole pair to produce STE emission. Accordingly, the spectral emissions under photon and neutron irradiation of a CVL scintillator have very different observed characteristics.

CVL scintillators that detect gamma photons as well as incident neutrons are required for gamma-neutron discrimination. One such CVL scintillator is LiBaF$_3$. The naturally abundant Li consists of 7% of $^6$Li, which has a large cross-section (920 barns) for the capture of thermal neutrons. The thermal neutron absorption results in the production of simultaneously emitted energetic tritons, $^3$H particles and a-particles, $^4$He.

Figure 2:
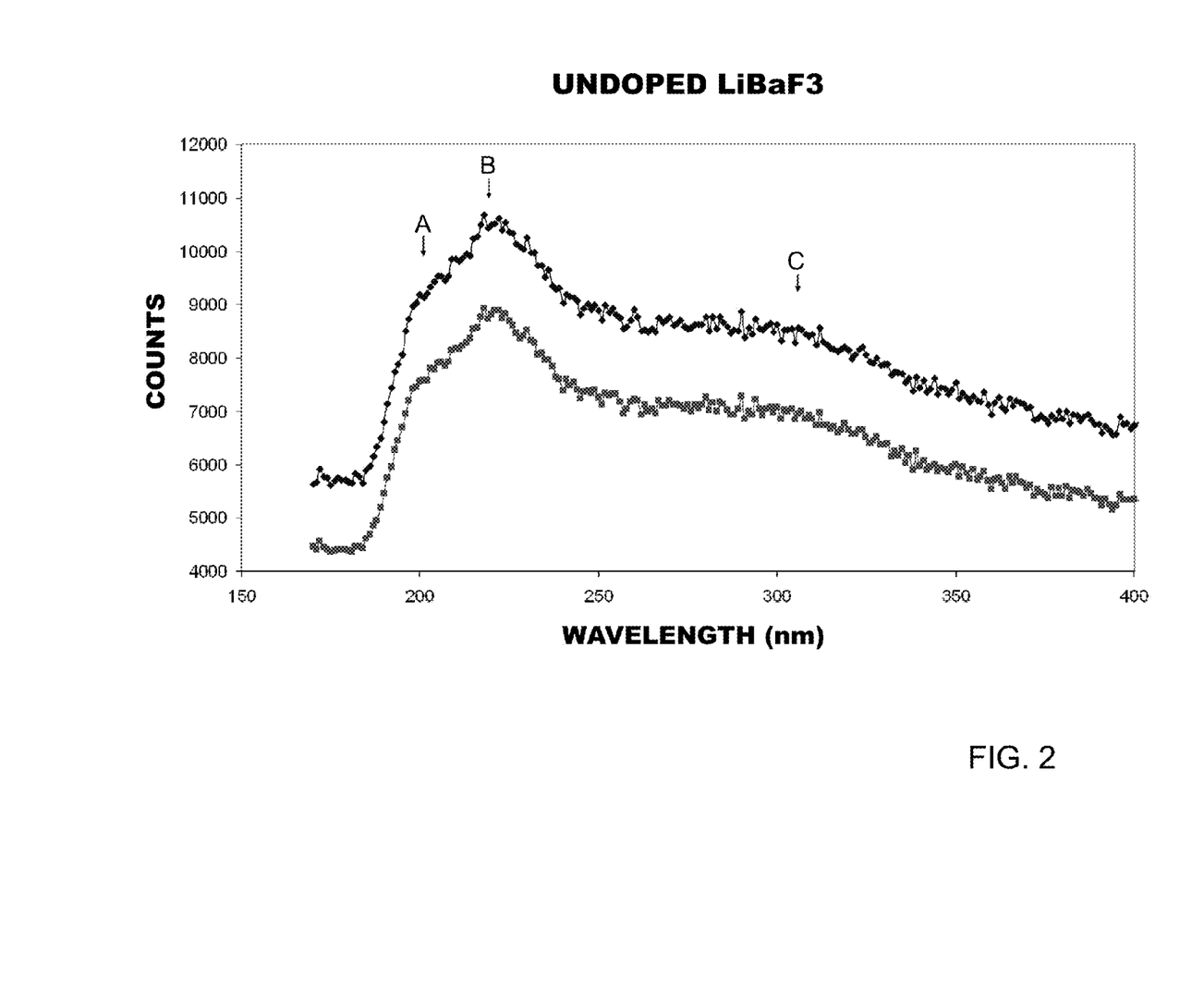
FIG. 2 is a graph illustrating measured emission peaks at 200 nm, 220 nm (CVL), and 300 nm (STE), for un-doped $LiBaF_3$.

With reference to FIG. 2, LiBaF$_3$ is a CVL scintillator that exhibits core-valence luminescence in addition to self-trapped exciton emission. FIG. 2 shows the measured optical emission spectrum of LiBaF$_3$, which does not contain any activator ion such as Ce$^{3+}$, etc. In FIG. 2, the two peaks (peak "A," at 200 nm; peak "B," at 220 nm) are identified as arising due to CVL, while the third peak (peak "C," at 300 nm) is identified as being due to the STE emission process.

Another CVL scintillator of interest herein is cerium-doped Cesium Lithium Yttrium Hexa-Chloride (Cs$_2$LiYCl$_6$:Ce). In addition to its high sensitivity to gamma-ray photons, the presence therein of natural Li, which contains 7% $^6$Li, makes Cs$_2$LiYCl$_6$:Ce sensitive to thermal neutrons due to the afore-noted large cross-section for neutron capture with the emission of energetic ions. Therefore, this scintillator can simultaneously detect gamma photons and neutrons.

Figure 3:
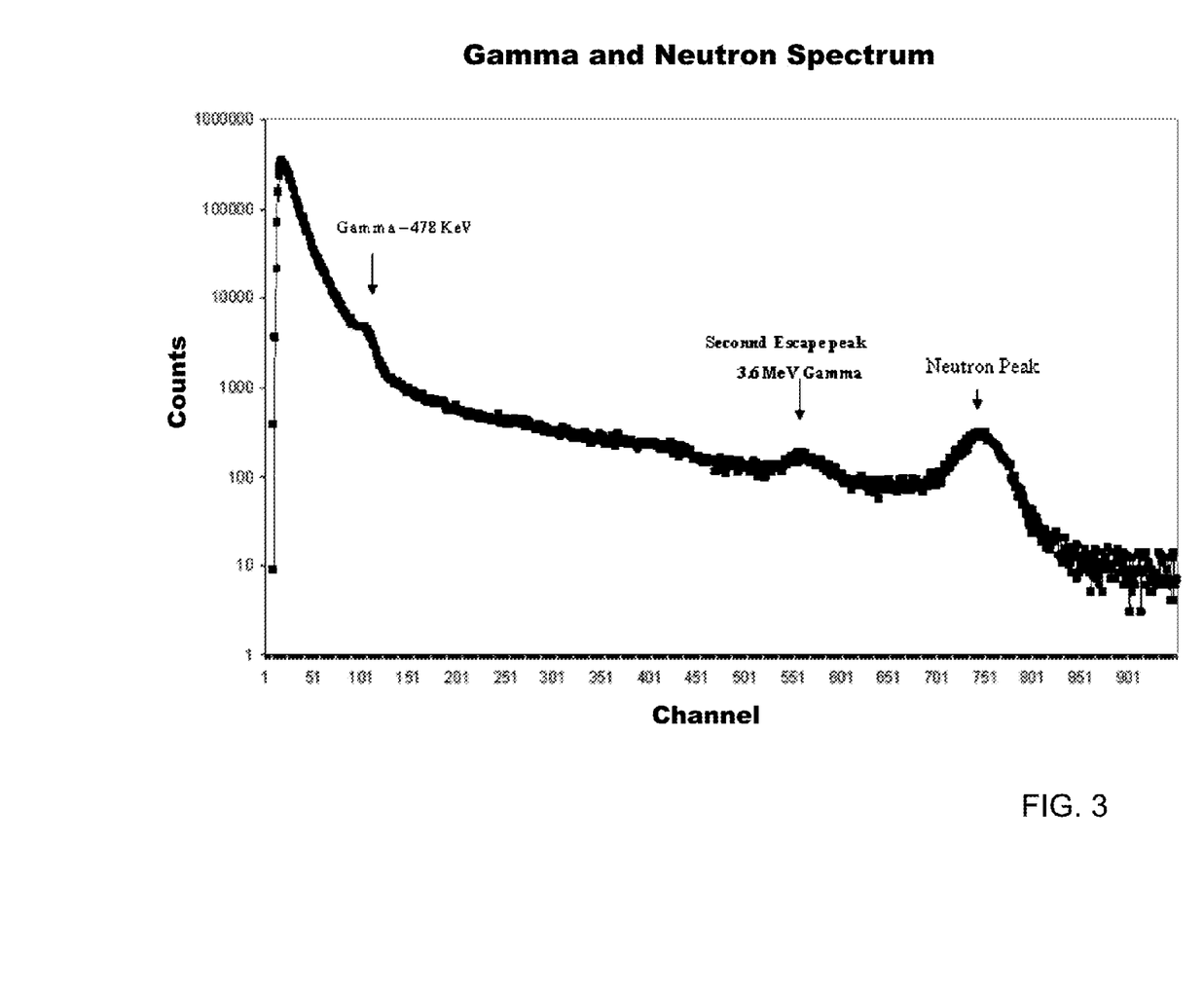
FIG. 3 is representative of a scintillation pulse height spectrum based on measured data in the "unfiltered emission phase" of the present invention's method for performing neutron-gamma discrimination. The light emissions are produced by gamma photons and by neutrons.

Referring to FIG. 3, in a typical environment where both gamma-ray photons and neutrons are present, Cs$_2$LiYCl$_6$:Ce can detect both at the same time. The pulse height spectrum shown by way of example in FIG. 3 is taken of neutrons produced by a $^9$Be(p,n) reaction. This reaction produces a gamma-ray photon of 3.6 MeV in addition to fast neutrons.

In the spectrum shown in FIG. 3, there are two gamma-ray peaks, namely, at 478 keV and 2.5 MeV. The first gamma-ray peak arises due to the capture of thermal neutrons by $^{10}$B in the boron-loaded polyethylene used as shielding to contain the fast neutron beam produced from the $^9$Be(p,n) reaction. The second gamma-ray peak is attributed to the second escape peak of a gamma-ray photon of 3.6 MeV emitted by the production of an excited state of $^6$Li as a result of another nuclear reaction, $^9$Be(p,$^6$Li)$^4$He, which occurs during the production of fast neutrons. The third peak is due to thermal neutrons, which appears at gamma equivalent energy of ~3.2 MeV.

The earlier literature discloses that CVL decays much faster than either STE or the doped impurity emission, and that thus, by the use of pulse shape analysis, it is possible to differentiate between gamma-ray photons and incident neutrons. This concept was further developed as disclosed by P. L Reeder and S. M. Bowyer, U.S. Patent Application Publication No. 2002/0175291 A1, publication date 28 Nov. 2002), incorporated herein by reference. In their FIG. 6, Reeder et al. plot a two-dimensional histogram of short-interval pulse heights versus long-interval pulse heights to identify the two distinct regions in which the neutron and gamma-ray signals lie.

Still with reference to FIG. 3 and also with reference to FIG. 4 through FIG. 9, the present invention differs markedly from Reeder et al.'s teachings, and represents a novel approach to performing neutron-gamma discrimination. Typical inventive practice includes a phase of operation whereby gamma signals and neutron signals are separated spectrally by using one or more optical filters. The optical filter or filters can include any type or types, and combination of types, of optical filtering device.

FIG. 3 is illustrative of the inventive phase according to which no optical filter is implemented. CVL, STE, and doped impurity emissions are all transmitted. The "unfiltered pulse height spectrum" contains peaks characteristic of both gamma and neutrons which interact with atoms and/or nuclei contained in the CVL scintillator.

Figure 4:
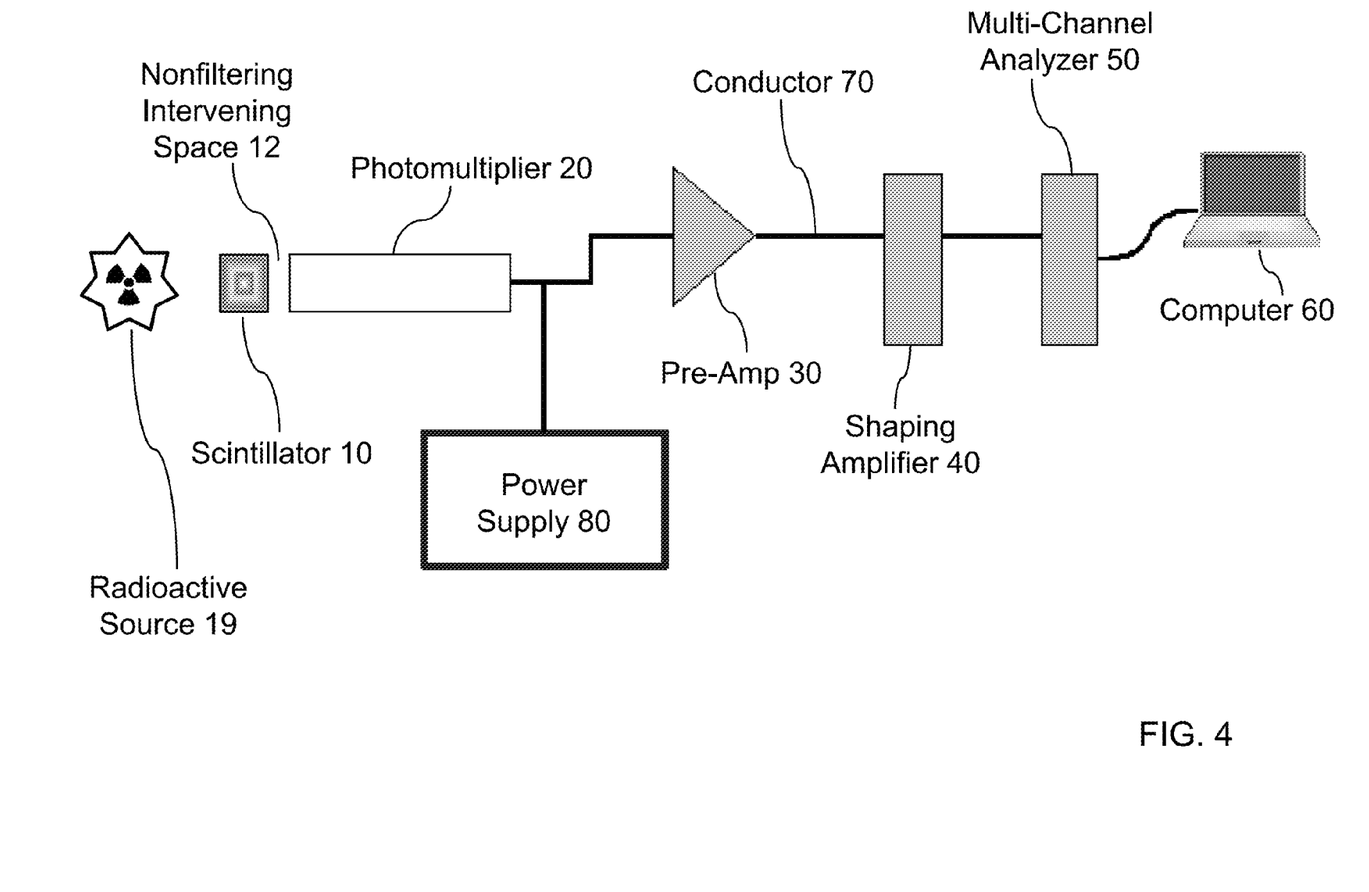
FIG. 4 is a schematic of a typical system for effecting the unfiltered emission phase of the present invention's method for performing neutron-gamma discrimination. The unfiltered-phase system shown in FIG. 4 includes a CVL scintillator, a light detector (e.g., photomultiplier), and electronics.

As illustrated in FIG. 4, a scintillator 10 is encountered by photons and charged particles emanating from a gamma radiation source 19. An extremely sensitive light detector such as a photodiode or a photomultiplier tube (PMT) 20 is situated next to a scintillator 10, with non-filtering space (e.g., an air gap) 12 therebetween. Since there is no filter, light that is emitted by the scintillator 10 and that reaches photomultiplier 20 is, for all intents and purposes, in unfiltered form; the slight degree of interference with the emitted scintillator light in non-filtering space 12 can be disregarded. Otherwise expressed, in the absence of a filtering means, the light is characterized herein as unfiltered, albeit transmissibility of the scintillator light to PMT 20 may not be perfect.

The photomultiplier 20 transmits analog (e.g., voltage) signals that are conditioned by preamplifier 30 and shaping amplifier 40, and which are then received by multichannel analyzer 50, which includes analog-to-digital conversion capability. The digitized data is transmitted from multichannel analyzer 50 to a computer 60, which processes the data. Electrical signals are transmitted between electronic components by an electrical conductor (e.g., wire or cable) 70. An electrical power supply 80, direct current or alternating current, powers the system.

Figure 5:
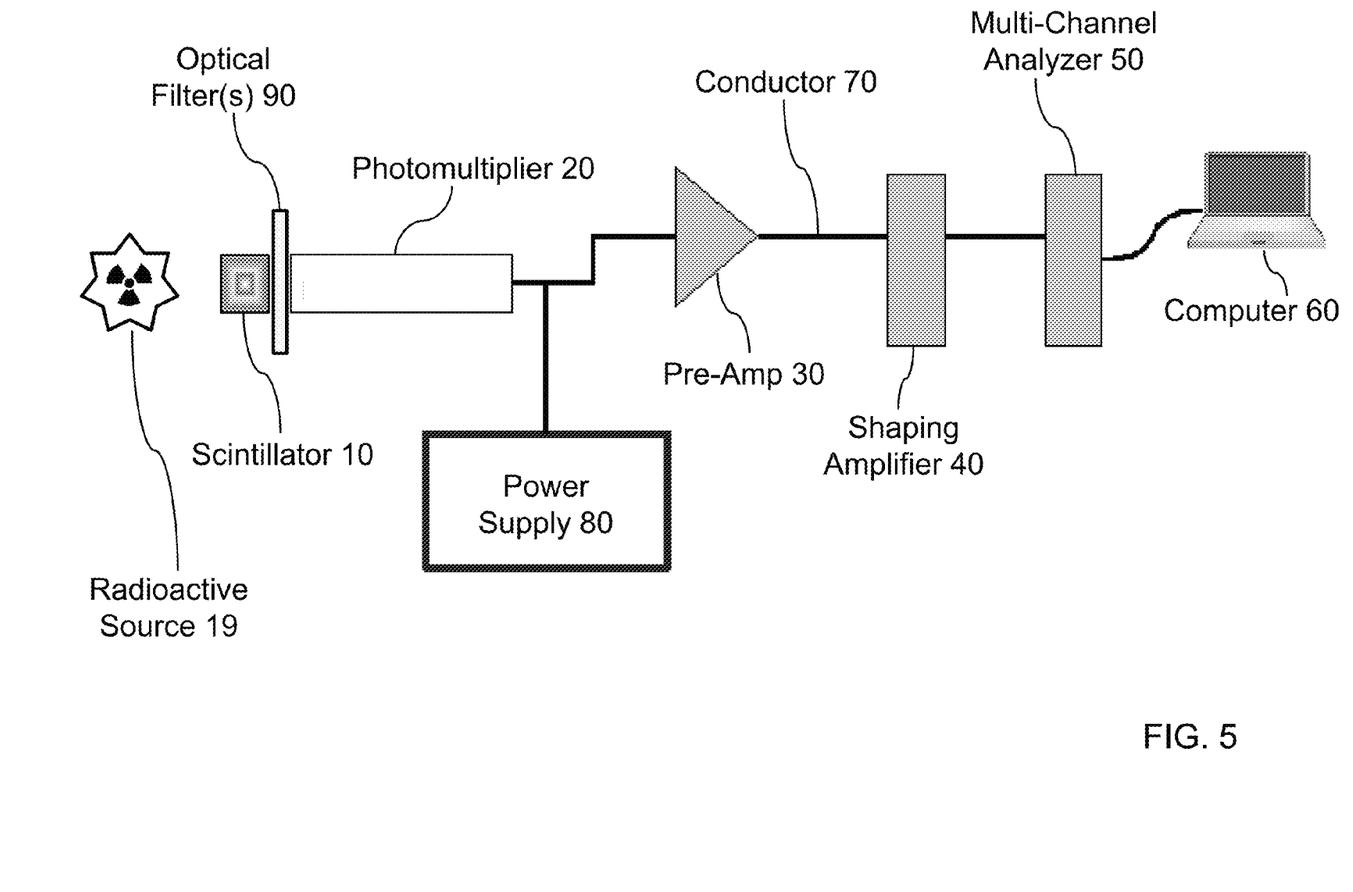
FIG. 5 is a schematic of a typical system for effecting the filtered emission phase of the present invention's method for performing neutron-gamma discrimination. The filtered-phase system shown in FIG. 5 includes the CVL scintillator, light detector (e.g., photomultiplier), and electronics shown in FIG. 4, and additionally includes an optical filter situated between the CVL scintillator and the light detector.
Figure 6:
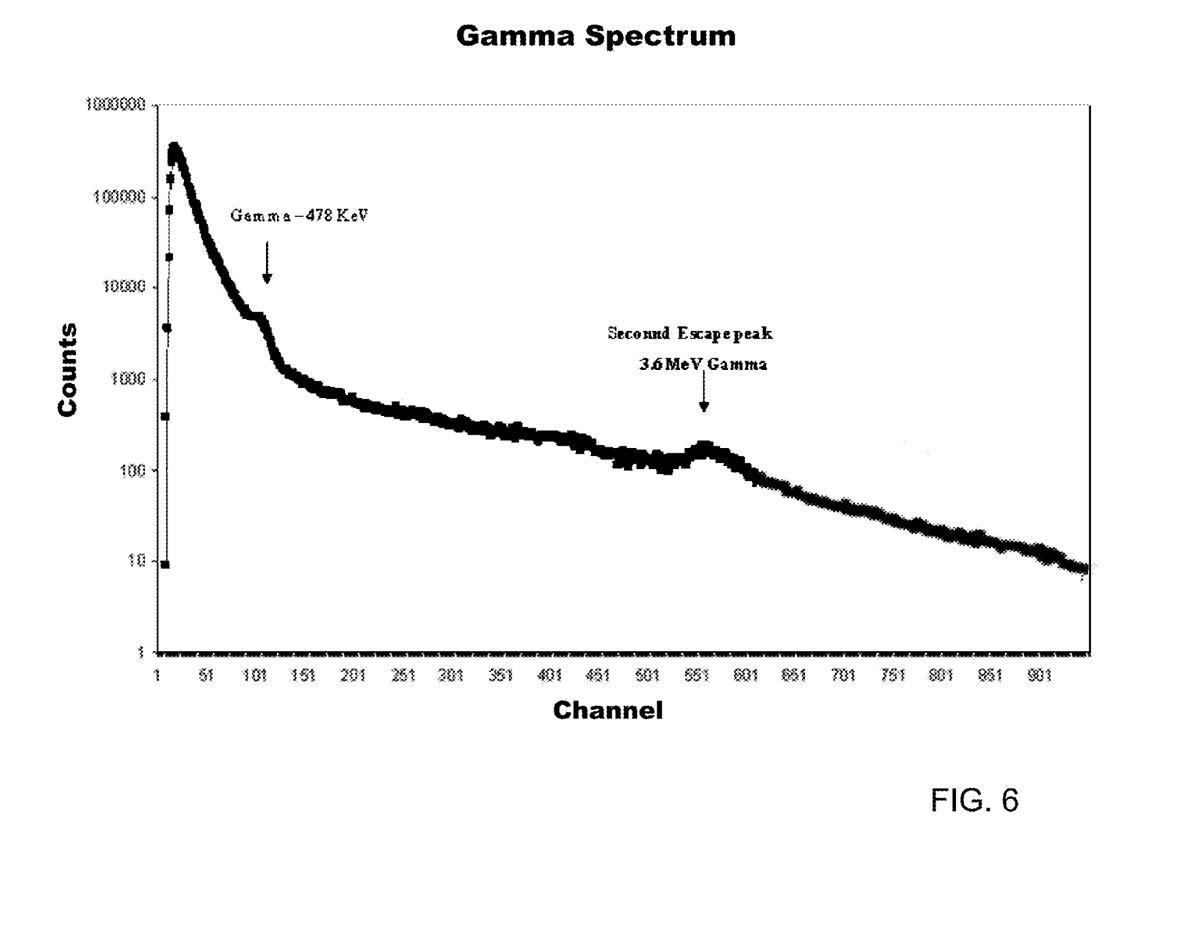

FIGS. 5 and 6 are illustrative of the inventive phase according to which one or more optical filters are implemented so as to transmit CVL, only. The optical filter(s) block(s) emissions from STE and any doped impurity. This inventive filtering gives rise to a "filtered pulse height spectrum." An inventively filtered pulse height spectrum is characteristic of only the gamma-ray photons that are interacting with the scintillator material.

According to typical inventive practice of the filtered emission phase, one or more filters 90 are incorporated into an existing pulse-height multichannel analyzer system. The filter(s) 90 is/are inserted between the scintillator and the photomultiplier. Since there is a filtering unit 90 between scintillator 10 and photomultiplier 20, light that is emitted by the scintillator 10 and that reaches photomultiplier 20 is filtered so as to exclude all forms of light except core-valence luminescent light. Otherwise expressed, the filtering means 90 blocks (interferes with) all of the emitted scintillator passing therethrough except core-valence luminescence.

Figure 7:
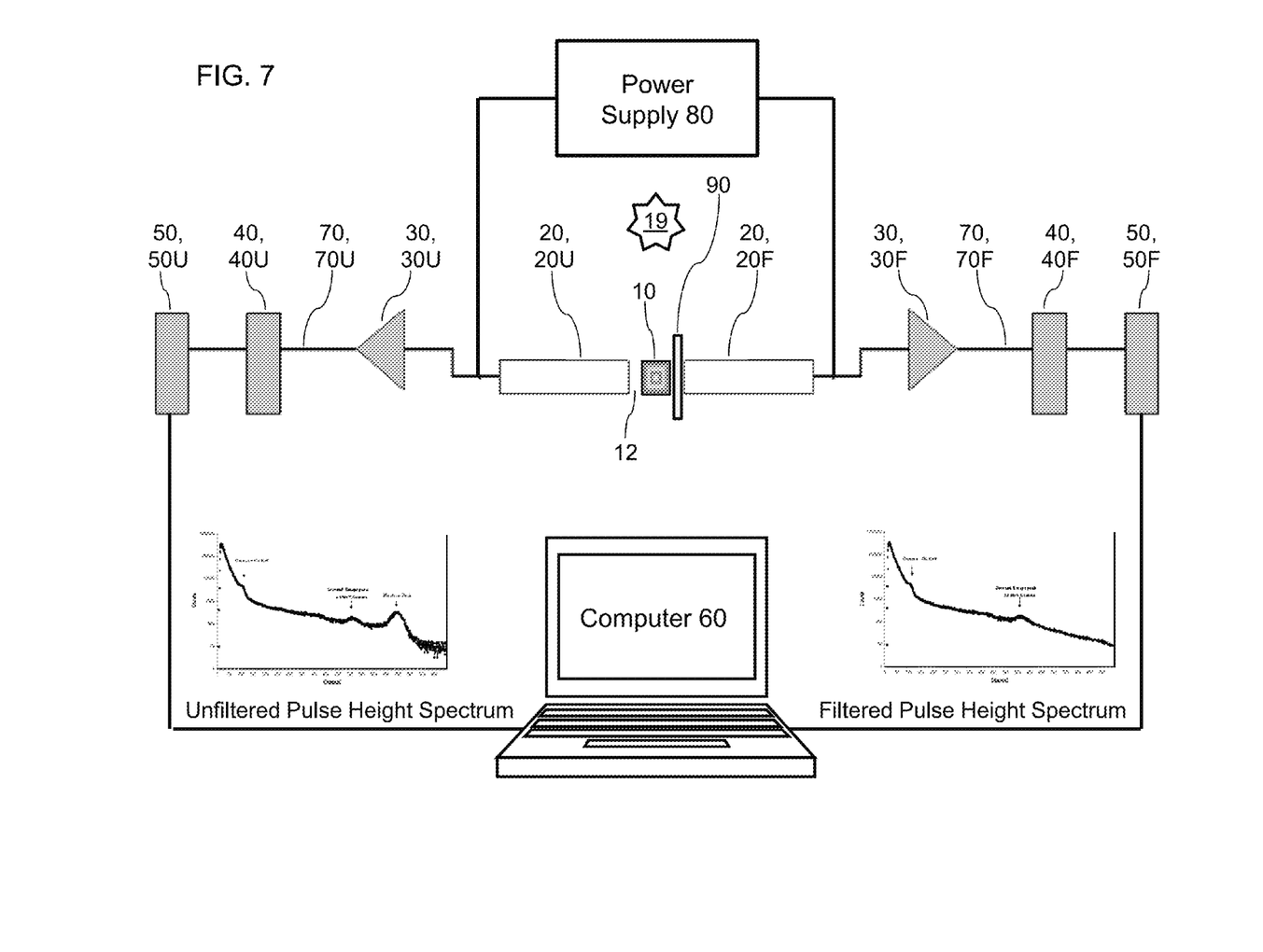
FIG. 7 is a schematic of a typical system for performing both (i) the unfiltered emission phase, and (ii) the filtered emission phase, of neutron-gamma discrimination in accordance with the present invention. The dual-phase system shown in FIG. 7 is capable of simultaneously performing the filtered emission phase (depicted on the right-hand side of FIG. 7) and the unfiltered emission phase (depicted on left-hand side of FIG. 7) of the present invention's methodology for performing neutron-gamma discrimination.

Filter device 90 in FIGS. 5 and 7 is depicted singularly for illustrative purposes. It is reemphasized that inventive practice permits any of various kinds of filters, and one or practically any plural number of filters. Several standard ways of using multiple filters can be implemented in inventive practice. For instance, filter wheels having different filters can used rotationally so as to selectively position a particular filter. As another example, a photomultiplier tube can be used with a segmented or split cathode whereby two different filters are used on the face of one cathode, with the desired signal pulled off of either of the split cathodes. Another alternative is to simply use at least two separate photomultiplier tubes (PMTs), each PMT being associated with its own filter, or with no filter at all.

The electronics shown in the block diagrams of FIGS. 4, 5, and 7 can implement off-the-shelf equipment in a compact fashion lending itself to portability and manual use. For instance, the electronics can be integrated into a single circuit board that: acquires the electrical pulses; has a fast analog-to-digital converter (ADC); and, implements the pulse shaping and histogramming via an integrated circuit such as a field-programmable gate array (FPGA). Amptek Inc., 14 De Angelo Drive, Bedford, Mass. 01730, is one of many manufacturers of commercially available equipment that can be utilized for electronic aspects of inventive practice.

It is preferable for many inventive embodiments that the power supply include a low-voltage dc supply for the amplifiers, as well as a high-voltage dc supply. High voltage (e.g., 2 kV dc) as well as low voltage (e.g., 5 volts dc) can be achieved by means of a commercially available Cockcroft-Walton high-voltage power supply. Thus, the present invention can be assembled in its entirety as a portable or hand-held system. Such inventive embodiments would be particularly beneficial for effecting gamma radiation detection with respect to boarders or first responders.

Particularly with reference to FIG. 3 and FIGS. 6 through 9, the present invention, as typically embodied, performs a comparison of filtered optical data (such as shown by way of example in FIG. 6) versus unfiltered optical data (such as shown by way of example in FIG. 3). Frequent inventive practice provides for a subtractive, net result (such as shown by way of example in FIG. 8).

Inventive practice of neutron-gamma discrimination is novel in its differentiation between the two forms of radiation, and is relatively straightforward. Through comparison of optically filtered data (obtained via measurement in the filtered phase) with optically unfiltered data (obtained via measurement in the unfiltered phase), the present invention attains results that are more dramatic and non-ambiguous than those attained by conventional practice of neutron-gamma discrimination. Another unique feature of the present invention, as frequently practiced, is its simultaneous determination of the appearance and disappearance of peaks recorded in a pulse height spectrum.

Typical practice of the present invention involves detection and analysis of light emissions of a CVL scintillator 10 that is interacting with ionizing radiation from a radioactive source 19. A preferred mode of inventive practice is to provide a unitary (e.g., portable) system for detecting and analyzing light emissions that operates with approximate simultaneity in terms of (i) the sensing and conditioning of signals from unfiltered light, (ii) the sensing and conditioning of signals from filtered (i.e., core-valence luminescent) light, and (iii) the processing (e.g., by a computer 60) of the conditioned electrical signals deriving from both forms of light sensing.

As shown in FIG. 7, the inventive unitary system includes a core-valence luminescence scintillator 10, a pair of light sensors 20, a pair of pre-amplifiers 30, a pair of pulse-shaping amplifiers 40, a pair of multi-channel analyzers (which includes an analog-to-digital converter) 50, a computer 60 (which includes a processor and a memory), a conductor (e.g., wire or cable) 70 (which includes a first conductor portion 70U and a second conductor portion 70F), a power supply 80, and a light-filtering apparatus 90 (which includes one or more filters and is capable of filtering light so as to transmit only core-valence luminescent light). Electrical (ac or dc) power supply 80 powers the entire inventive system. The present invention's detection-and-analysis unit is utilized in the vicinity of, and in association with, an ionizing radiation source 19.

Typical inventive practice may be described as being functionally dichotomized in accordance with first and second sensory configurations. First and second pulse height spectral data sets are respectively generated via the first and second configurations, and are compared using a computer 60. In accordance with the first sensory configuration, the sensed light is unfiltered light, and includes gamma emissions (which are associated with gamma photons) and neutron emissions (which are associated with neutrons). In accordance with the second sensory configuration, the sensed light is filtered light (i.e., light filtered by filtering apparatus 90), and includes gamma emissions but does not include neutron emissions.

The first sensory configuration mainly corresponds to the left-hand side of FIG. 7, and includes ionizing radiation source 19, core-valence luminescence scintillator 10, first light sensor 20U, first amplifiers 30U and 40U, and first analog-to-digital converter 50U. Light that is emitted by the core-valence luminescence scintillator 10 (in response to ionizing radiation from ionizing radiation source 19) and that reaches first light sensor 20U is unfiltered, as indicated by empty space 12.

The first pulse height spectral data set is based on electrical pulses produced by first light sensor 20U that are indicative of the sensed unfiltered light that is emitted by core-valence luminescence scintillator 10 in response to ionizing radiation emanating from ionizing radiation source 19. The sensed unfiltered light includes gamma emissions and neutron emissions. The first pulse height spectral data set is representative of at least one magnitude of the combination of light emissions including gamma emissions and neutron emissions.

The second sensory configuration mainly corresponds to the right-hand side of FIG. 7, and includes ionizing radiation source 19, core-valence luminescence scintillator 10, second light sensor 20F, second amplifiers 30F and 40F, second analog-to-digital converter 50F, and a filtering apparatus 90, which includes at least one filter. Filtering apparatus 90 is interposed between core-valence luminescence scintillator 10 and second light sensor 20F. Light that is emitted by core-valence luminescence scintillator 10 (in response to ionizing radiation from ionizing radiation source 19) and that reaches second light sensor 20F is filtered by filtering apparatus 90 so as to consist of core-valence luminescent light only.

The second pulse height spectral data set is based on electrical pulses produced by second light sensor 20F that are indicative of the light filtered as core-valence luminescent light. The second pulse height spectral data set is based on electrical pulses produced by second light sensor 20U that are indicative of the sensed filtered light that is emitted by core-valence luminescence scintillator 10 in response to ionizing radiation emanating from ionizing radiation source 19. The sensed filtered light includes gamma emissions but does not include neutron emissions. The second pulse height spectral data set is representative of at least one magnitude of the light emissions including gamma emissions and excluding neutron emissions.

Figure 9:
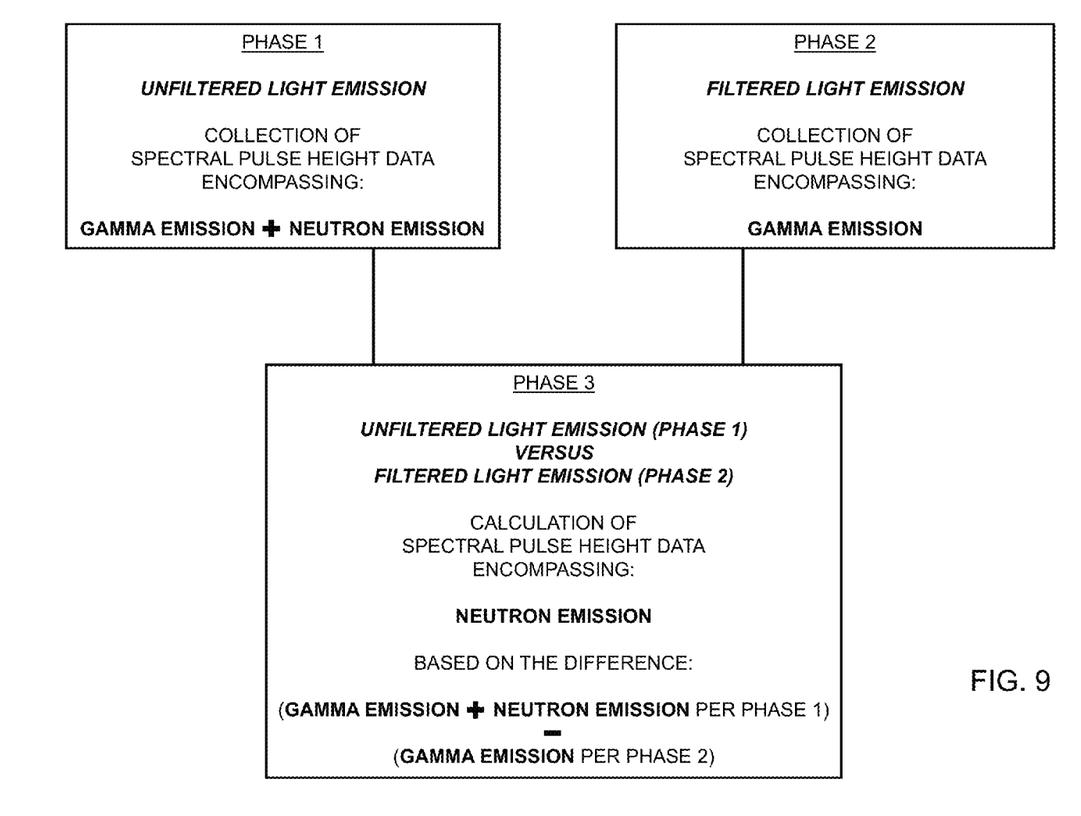
FIG. 9 is a block diagram of a typical methodology for performing dual-phase neutron-gamma-discriminative scintillation detection in accordance with the present invention.

Computer 60 is configured to execute computer program logic that, when executed, is capable of processing electrical signals originating from first light sensor 20U and second light sensor 20F. As depicted in FIG. 9, typical inventive practice includes three phases, namely: (1) an unfiltered emission phase, resulting in a first pulse height spectral data set; (2) a filtered emission phase, resulting in a second pulse height spectral data set; and, (3) a filtered-versus-unfiltered emission-comparison phase, resulting in at least one neutron-gamma discriminative finding, such as a third pulse height spectral data set. In the computational comparison phase, the first and second pulse height spectral data sets are compared by computer 60. The calculative comparison via computer 60 succeeds in discriminating between two forms of light emissions by core-valence luminescence scintillator 10, viz., gamma photon emissions and neutron emissions.

According to frequent inventive practice, the computation includes a subtractive calculation that solves for the neutron emissions. Subtraction of the gamma emissions from the combined gamma-and-neutron emissions yields the neutron emissions. Otherwise expressed, the second pulse height spectral data set (viz., the empirical gamma-only data set) is subtracted from the first pulse height spectral data set (viz., the empirical gamma-plus-neutron data set), thereby leaving a third pulse height data set (viz., the calculated neutron-only data set).

Figure 8:
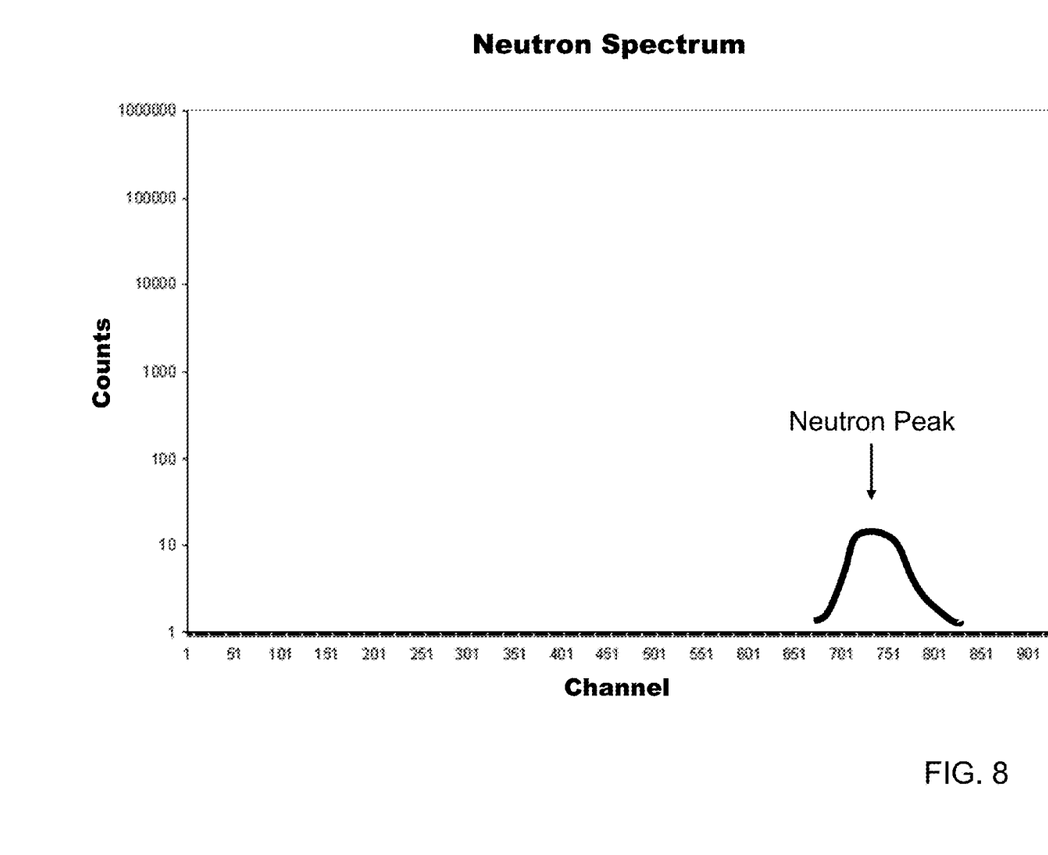

By way of example, the gamma-only data set shown in FIG. 6 is subtracted from the gamma-plus-neutron data set shown in FIG. 3, thereby leaving the neutron-only data set shown in FIG. 8. In each graph, the channels are indicated in the x-axis and the numbers of counts are indicated in the y-axis. For each channel, the number of counts per FIG. 6 is subtracted from the number of counts per FIG. 3, with the subtractive difference for each count being reflected in FIG. 8.

Other modes of inventive practice are possible, for instance involving a methodology whereby two separate devices (each device containing a CVL scintillator 10 and electronics) are used for sensing and conditioning electrical pulses from unfiltered versus filtered light. In accordance with inventive embodiments of this nature, and depending on the inventive embodiment, the unfiltered-light sensing-and-conditioning component and the filtered-light sensing-and-conditioning component can be implemented either concurrently or sequentially, with the respective data being fed into the same computer 60.

According to another sequential mode of inventive practice, a single inventive device (containing a CVL scintillator 10 and electronics) is used sequentially to implement both the unfiltered-light sensing-and-conditioning component and the filtered-light sensing-and-conditioning component. The respective data from the two components are fed into the same computer 60. One stage is performed sans filter apparatus 90, and the other stage is performed with filter apparatus 90. The order can be: filter stage, then removal of filter apparatus, then filter-less stage; or, filter-less stage, then insertion of filter apparatus, then filter stage.

The present invention is applicable, at least, to all CVL scintillators that contain natural lithium, boron, or some isotope of Gd. According to some inventive embodiments, the CVL effect is enhanced by tailoring the crystal properties. For example, if natural lithium is replaced by pure $^6$Li, the neutron detection efficiency will increase ~14-15 fold. Similar results are expected when natural B is replaced with $^{10}$B.

The intensity of the CVL emitted by a CVL scintillator is low. Accordingly, the inventively implemented filters must have as high a transparency as possible with regard to the CVL. The present inventors conducted testing of the present invention, generating the required neutron and gamma fields using the Positive Ion Accelerator Facility Experimentation at the Naval Surface Warfare Center, Carderock Division (NSWCCD), located in West Bethesda, Md. The experimentation performed by the present inventors indicates that the current state of the filtering arts is capable of enabling inventive practice to achieve CVL transparencies of approximately twenty-five percent; that is, current optical filtering techniques result in transmission of about 25% of the CVL and blockage of about 75% of the CVL. Although current CVL transparency efficiencies permit useful practice of the present invention, it is expected that filtering technologies will advance so that filters will be increasingly transparent to CVL, thereby permitting increasingly useful practice of the present invention.

It is possible that CVL that is emitted is absorbed by an impurity dopant also within the scintillator crystal. This problem can be overcome by selecting an impurity dopant that does not absorb the CVL. Study of the excitation spectrum of the impurity can provide this information.

When deployed in challenging and extreme environments, existing $^3$He tube neutron detectors not only suffer from a variety of technical problems but are also increasingly difficult to obtain due to the present worldwide shortage of $^3$He for these purposes. An important new realm of applications for CVL devices and their associated components would be to serve as compact, efficient, and reliable replacements for existing $^3$He tube neutron detectors. The present invention would be well suited for these applications.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer program product comprising a non-transitory computer readable storage medium having a computer readable program stored thereon for execution by a computer to perform a method for examining detected light emissions of a scintillator interacting with ionizing radiation from a radioactive source, the method including generating plural pulse height spectral data sets, wherein:
   said scintillator is a core-valence luminescence scintillator that is capable, when interacting with said ionizing radiation from said radioactive source, of emitting light that includes gamma emissions and neutron emissions;
   each said pulse height spectral data set is based on electrical pulses generated by a light sensor that are indicative of said light that is received by said light sensor and that is emitted by a core-valence luminescence scintillator when interacting with said ionizing radiation from said radioactive source;
   said generating of said plural pulse height spectral data sets includes generating a first said pulse height spectral data set and generating a second said pulse height spectral data set;
   the first said pulse height spectral data set is based on electrical pulses generated by said light sensor that are indicative of unfiltered said light that is emitted by said core-valence luminescence scintillator when interacting with said ionizing radiation from said radioactive source;
   the second said pulse height spectral data set is based on electrical pulses generated by said light sensor that are indicative of filtered said light that is emitted by said core-valence luminescence scintillator when interacting with said ionizing radiation from said radioactive source;
   the unfiltered said light that is emitted by said core-valence luminescence scintillator when interacting with said ionizing radiation from said radioactive source includes said gamma emissions by said core-valence luminescence scintillator, and includes said neutron emissions by said core-valence luminescence scintillator;
   the filtered said light that is emitted by said core-valence luminescence scintillator when interacting with said ionizing radiation from said radioactive source includes said gamma emissions by said core-valence luminescence scintillator, and does not include said neutron emissions by said core-valence luminescence scintillator.

2. The computer program product of claim 1, the method further including comparing said first pulse height spectral data set and said second pulse height spectral data set, wherein said comparing includes discriminating between said gamma emissions by said core-valence luminescence scintillator, and said neutron emissions by said core-valence luminescence scintillator.

3. The computer program product of claim 2 wherein said discriminating includes subtracting the second said pulse height spectral data set from the first said pulse height spectral data set, thereby determining said neutron emissions by said core-valence luminescence scintillator.

4. The computer program product of claim 2 wherein:
   said gamma emissions are associated with gamma photons;
   said neutron emissions are associated with neutrons;
   said light that is emitted by said core-valence luminescence scintillator when interacting with said ionizing radiation from said radioactive source is filtered, as core-valence luminescent light only, by at least one optical filter placed between said core-valence luminescence scintillator and said light sensor.

5. A method for detecting and analyzing light emissions of a scintillator interacting with ionizing radiation from a radioactive source, the method comprising:
   providing a core-valence luminescence scintillator, said core-valence luminescence scintillator being capable, in response to ionizing radiation from an ionizing radiation source, of emitting light that includes gamma emissions and neutron emissions;
   sensing unfiltered said light that is emitted by said core-valence luminescence scintillator in response to said ionizing radiation from said ionizing radiation source, wherein the unfiltered said light that is emitted by said core-valence luminescence scintillator includes said gamma emissions and said neutron emissions;
   generating a first pulse height spectral data set, said first pulse height spectral data set being based on electrical pulses produced by a light sensor that are indicative of the unfiltered said light that is emitted by said core-valence luminescence scintillator;
   sensing filtered said light that is emitted by said core-valence luminescence scintillator in response to said ionizing radiation from said ionizing radiation source, wherein the filtered said light that is emitted by said core-valence luminescence scintillator includes said gamma emissions and does not include said neutron emissions;
   generating a second pulse height spectral data set, said second pulse height spectral data set being based on electrical pulses produced by a light sensor that are indicative of the filtered said light that is emitted by said core-valence luminescence scintillator.

6. The method for detecting and analyzing light emissions as recited in claim 5 wherein said a computer is used for said generating of said first pulse height spectral data set and for said generating of said second pulse height spectral data set.

7. The method for detecting and analyzing light emissions as recited in claim 5 wherein said sensing of the filtered said light that is emitted by said core-valence luminescence scintillator includes interposing at least one optical filter between said core-valence luminescence scintillator and said light sensor.

8. The method for detecting and analyzing light emissions as recited in claim 5 wherein said method further comprises comparing said first pulse height spectral data set and said second pulse height spectral data set, and wherein said comparing includes discriminating between said gamma emissions and said neutron emissions that are included in said light that is emitted by said core-valence luminescence scintillator in response to said ionizing radiation from said ionizing radiation source.

9. The method for detecting and analyzing light emissions as recited in claim 8 wherein said sensing of the filtered said light that is emitted by said core-valence luminescence scintillator includes interposing at least one optical filter between said core-valence luminescence scintillator and said light sensor.

10. The method for detecting and analyzing light emissions as recited in claim 9 wherein said comparing includes using a computer.

11. The method for detecting and analyzing light emissions as recited in claim 8 wherein said discriminating includes subtracting said second pulse height spectral data set from said first pulse height spectral data set, thereby determining said neutron emissions that are included in said light that is emitted by said core-valence luminescence scintillator in response to said ionizing radiation from said ionizing radiation source.

12. The method for detecting and analyzing light emissions as recited in claim 11 wherein said sensing of the filtered said light that is emitted by said core-valence luminescence scintillator includes interposing at least one optical filter between said core-valence luminescence scintillator and said light sensor.

13. The method for detecting and analyzing light emissions as recited in claim 12 wherein said comparing includes using a computer.

14. The method for detecting and analyzing light emissions as recited in claim 12 wherein:
   a first said sensor is used for said sensing of the unfiltered said light that is emitted by said core-valence luminescence scintillator;
   a second said sensor is used for said sensing of the filtered said light that is emitted by said core-valence luminescence scintillator;
   said generating of said first pulse height spectral data set and said generating of said second pulse height spectral data set are performed at least substantially simultaneously.

15. The method for detecting and analyzing light emissions as recited in claim 8 wherein:
   said gamma emissions are associated with gamma photons;
   said neutron emissions are associated with neutrons;
   the filtered said light that is emitted by said core-valence luminescence scintillator consists of core-valence luminescent light.

16. A system for detecting and analyzing light emissions of a scintillator interacting with ionizing radiation from a radioactive source, the system comprising:
   a core-valence luminescence scintillator, capable of emitting light in response to an ionizing radiation source, wherein said light that is emitted by said core-valence luminescence scintillator includes gamma emissions and neutron emissions, said gamma emissions being associated with gamma photons, said neutron emissions being associated with neutrons;
   a light-filtering apparatus, capable of filtering said light that is emitted by said core-valence luminescence scintillator, wherein said light that is emitted by said core-valence luminescence scintillator and that is unfiltered includes said gamma emissions and said neutron emissions, and wherein said light that is emitted by said core-valence luminescence scintillator and that is filtered by said light-filtering apparatus includes said gamma emissions and excludes said neutron emissions;

at least one light sensor, for sensing said light that is emitted by said core-valence luminescence scintillator, wherein said at least one light sensor is capable of sensing said light that is emitted by said core-valence luminescence scintillator and that is unfiltered, and wherein said at least one light sensor is further capable of sensing said light that is emitted by said core-valence luminescence scintillator and that is filtered by said light-filtering apparatus;

a computer configured to execute computer program logic stored on a non-transitory computer readable storage medium, wherein said computer program logic, when executed, is capable of processing electrical signals originating from said at least one light sensor, said processing including discriminating between said gamma emissions and said neutron emissions that are included in said light that is emitted by said core-valence luminescence scintillator, wherein according to said computer program logic:

a first pulse height spectral data set is based on electrical signals originating from said at least one light sensor that are indicative of said light that is emitted by said core-valence luminescence scintillator and that is unfiltered, said first pulse height spectral data set being representative of at least one magnitude of said light that is emitted by said core-valence luminescence scintillator and that includes said gamma emissions and said neutron emissions;

a second pulse height spectral data set is based on electrical signals originating from said at least one light sensor that are indicative of said light that is emitted by said core-valence luminescence scintillator and that is filtered by said light-filtering apparatus, said second pulse height spectral data set being representative of at least one magnitude of said light that is emitted by said core-valence luminescence scintillator and that includes said gamma emissions and excludes said neutron emissions;

at least one magnitude of said neutron emissions is determined by subtracting said second pulse height spectral data set from said first pulse height spectral data set.

17. The system for detecting and analyzing light emissions as recited in claim 16 wherein said light-filtering apparatus is interposed between and proximate to said core-valence luminescence scintillator and at least one of said at least one light sensor.

18. The system for detecting and analyzing light emissions as recited in claim 17, further comprising at least one analog-to-digital converter, for receiving analog signals from said at least one light sensor and for transmitting digital signals to said computer.

19. The system for detecting and analyzing light emissions as recited in claim 18 wherein:

the sensing of said light that is emitted by said core-valence luminescence scintillator and that is unfiltered, the sensing of said light that is emitted by said core-valence luminescence scintillator and that is filtered by said light-filtering apparatus, and the processing of said electrical signals are performed approximately concurrently;

said at least one light sensor includes a first said light sensor and a second said light sensor;

the first said light sensor is for sensing said light that is emitted by said core-valence luminescence scintillator and that is unfiltered;

the second said light sensor is for sensing said light that is emitted by said core-valence luminescence scintillator and that is filtered by said light-filtering apparatus;

said at least one analog-to-digital converter includes a first said analog-to-digital converter and a second said analog-to-digital converter;

the first said analog-to-digital converter is for receiving said analog signals from said first light sensor and for transmitting said digital signals received from said first light sensor to said computer;

the second said analog-to-digital converter is for receiving said analog signals from said second light sensor and for transmitting said digital signals received from said second light sensor to said computer;

said light-filtering apparatus is interposed between and proximate to said core-valence luminescence scintillator and said second light sensor.

20. The system for detecting and analyzing light emissions as recited in claim 19 wherein said core-valence luminescence scintillator, said at least one light sensor, said at least one analog-to-digital converter, and said computer are included in a portable detection-and-analysis unit for utilization in the vicinity of, and in association with, an ionizing radiation source.

* * * * *